NESTABLE CART
Filed Aug. 3, 1964 2 Sheets-Sheet 1
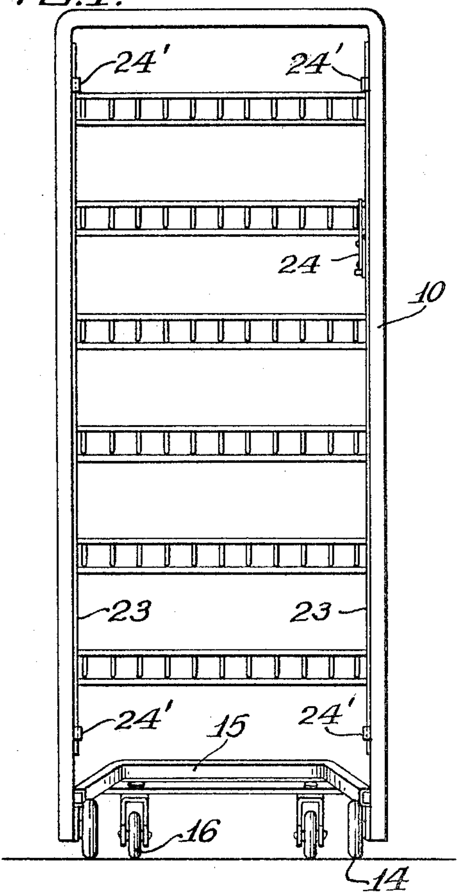
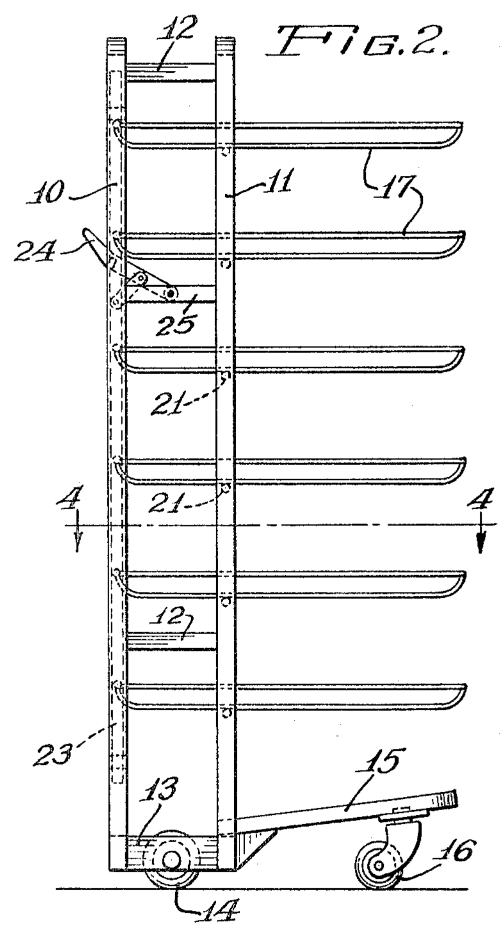
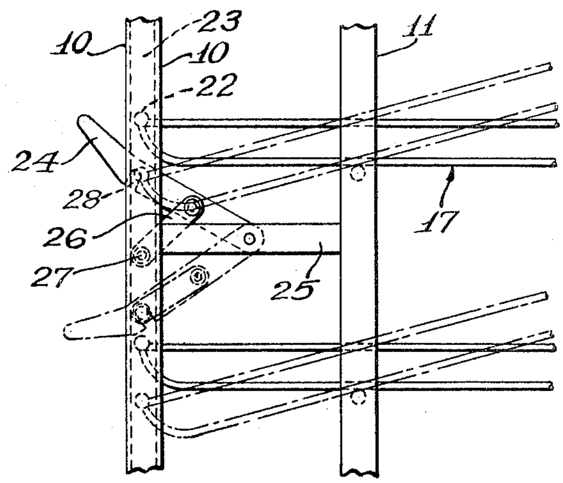
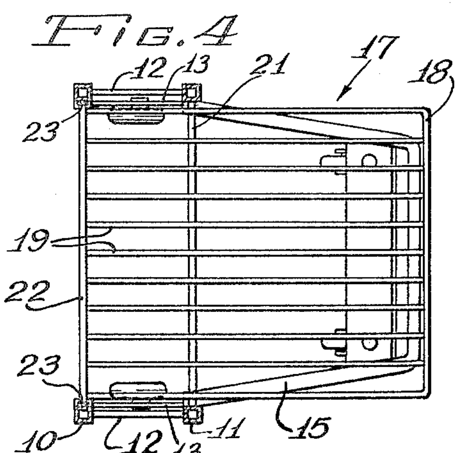
Inventors.
Fred W. Young
Ralph G. Hummer
By Bair, Freeman & Molinare
Attys.

NESTABLE CART
Filed Aug. 3, 1964 2 Sheets-Sheet 2
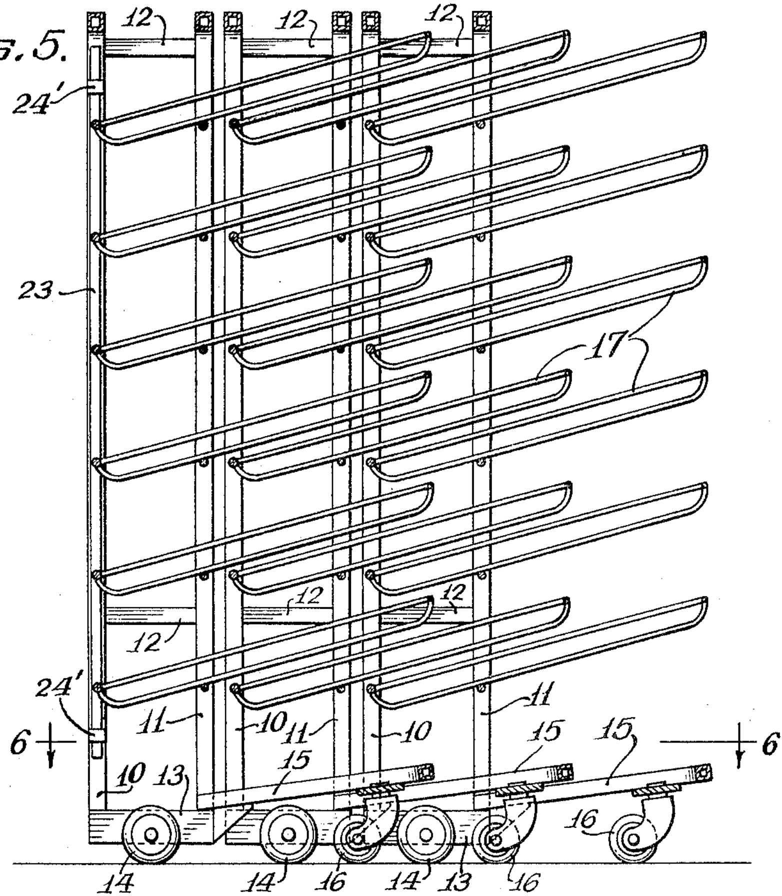
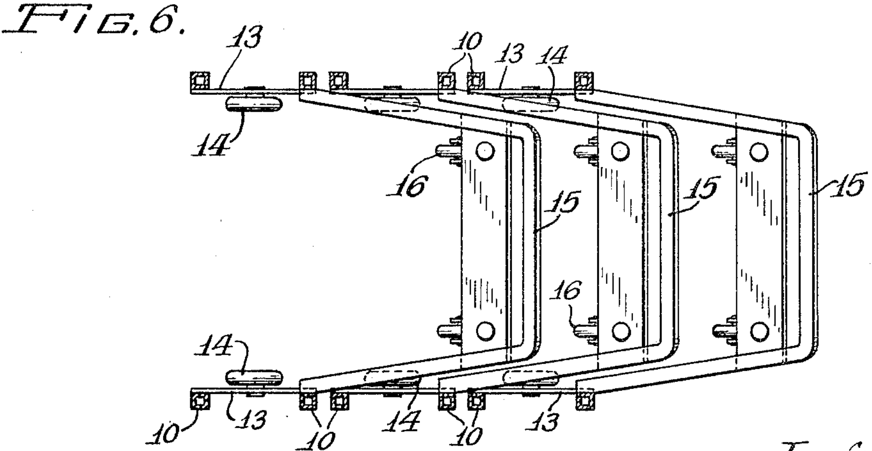
Inventors:
Fred W. Young
Ralph G. Hummer
By Bair Freeman & Molinare
Attys.

United States Patent Office 3,272,528 Patented Sept. 13, 1966

3,272,528

NESTABLE CART

Fred W. Young and Ralph G. Hummer, Oklahoma City, Okla., assignors to Unarco Industries, Inc., a corporation of Illinois Filed Aug. 3, 1964, Ser. No. 387,016
6 Claims. (Cl. 280—33.99)

This invention relates to nestable carts and more particularly to a cart having a plurality of vertically spaced trays or baskets for carrying various types of articles.

In handling articles such as food trays or the like in hospitals and similar environments, it is common practice to transport the food trays on carts having a plurality of shelves on which the food trays are individually carried. Such carts are relatively large and bulky requiring a large amount of storage space. It is highly desirable therefore that carts of this character be so constructed that they can internest for storage and to facilitate handling when unloaded.

It is also desirable in carts for handling articles such as food trays as mentioned above that the trays or shelves be rectangular. In nesting type carts as heretofore constructed the trays or shelves have commonly tapered to internest with each other but the tapered construction does not lend itself advantageously to the handling of rectangular articles such as food trays.

It is accordingly an object of the present invention to provide a nestable cart having a plurality of vertically spaced trays or shelves movable from a horizontal working position to a storage position at an angle to the horizontal in which trays on adjacent carts may interfit.

According to an important feature of the invention the trays or shelves may be rectangular and may interfit or nest by being moved to a position at an angle to the horizontal in which they will fit in vertical relationship to each other.

Another object is to provide a nestable cart in which the trays or shelves are innerconnected for simultaneous tilting movement and are simultaneously moved from their working to their storage position by a single operating mechanism.

Accordingly to another feature of the invention the trays or shelves are pivotally mounted on a vertical frame and are pivotally connected to a link which is vertically movable on a second vertical frame spaced horizontally from the first frame. The frames are preferably mounted on the rear ends of a forwardly tapering U-shaped base which is supported on wheels and shaped to internest with adjacent similar bases.

According to a further feature of the invention the operating mechanism for controlling tilting of the trays comprises a toggle linkage which is moved to an overcenter position when the trays or shelves are in one position to function as a latch.

The above and other objects and features of the invention will be more readily apparent from the following description when read in connection with the accompanying drawings in which:

FIG. 1 is an end view of a nestable cart embodying the invention;

FIG. 2 is a side elevation;

FIG. 3 is an enlarged partial side elevation showing the parts in different portions;

FIG. 4 is a top plan view;

FIG. 5 is a side view showing several carts in internested relationship, and;

FIG. 6 is a section on the line 6—6 of FIG. 5.

Each of the carts as shown comprises a vertical upright frame including two inverted U-shaped members 10 and 11 spaced horizontally apart. Each of the U-shaped members includes a pair of side uprights connected by a cross beam at the top. The upright frame members 10 and 11 are connected and held spaced apart at the top by a brace 12 and the lower ends of the legs of the frame members are secured to side frame pieces 13 on which rear wheels 14 for the cart are mounted. The base is completed by a forwardly tapering U-shaped cart 15, which preferably extends upwardly at a slight angle to the horizontal as shown and which carries spaced front wheels 16 at its forward end. The wheels 16 are preferably mounted on casters as shown to permit easy steering control of the cart.

The cart supports a plurality of generally horizontal tray or shelf units 17, six such units being shown in the cart illustrated, although this number could be varied as desired. Each of the shelf or tray units 17 as best seen in FIG. 4 is formed of wire with an outer peripheral framing wire 18 of rectangular configuration extending completely around the periphery of the tray and with a plurality of spaced longitudinally extending wires 19 forming the bottom of the tray or shelf. While relatively shallow trays or shelves have been shown of the type particularly adapted for handling food trays or the like, it will be apparent that deeper trays or shelves more in the nature of baskets could be employed equally well. The trays are supported on the forward frame member 11 by means of pins or rods 21 which extend from one side to the other of the frame member and on which the bottoms of the trays or shelves 17 rest. At their rear ends the trays or shelves include a cross rod 22 which may form the rear part of the outer frame 18 of the tray or shelf. The rods 22 are pivotally connected at their ends to slides 23 which are mounted for vertical sliding on the side members of the rear frame 10. As shown in FIG. 1, the slides 23 are slidably supported by brackets 24′ secured to the inner faces of the frame 10 near the top and bottom thereof, although any other desired means for supporting the slides could be employed.

Through the slides 23 the several trays or shelves are innerconnected so that they will be held in parallel relationship with each other and will simultaneously be tilted between their horizontal working positions and their tilted storage positions. In order to move the slides 23 thereby to tilt the trays or shelves, a toggle linkage as best seen in FIG. 3 is provided. This linkage comprises a main operating lever 24 which is pivoted at one end on a cross piece 25 extending between the frame members 10 and 11 and which project beyond the rear face of the cart to be clasped easily and moved by an operator. The central part of the lever 24 is pivotally connected through a link 26 to the slides 23. As shown the link 26 is pivoted to one of the slides 23 by a pivot pin 27 and the lever 24 is formed with a notch 28 which will receive the pivot pin 27 when the lever is swung downward as shown in dotted lines in FIG. 3. While a toggle linkage mechanism has been illustrated as being applied at one side only of the cart to move to one of the slides directly, it will be apparent that similar mechanisms could be provided at both sides of the cart if this were found to be necessary. In using the cart the lever 26 is swung to its upper position as shown in FIGS. 2 and 3 to raise the slides 23 so that the pins 22 will be in an elevated position and the trays or shelves 17 will extend horizontally forwardly from the forward frame 11. In this position of the trays or shelves articles to be transported such as food trays may be placed thereon and will be retained in a level position.

When the carts are unloaded and are to be transported or stored, the lever 24 may be swung down to the dotted position shown in FIG. 3. This will lower the slides 23 thereby lowering the rear ends of the shelves or trays 17 and causing the trays to tilt upwardly at an acute angle to the horizontal. It will be noted from the showing in FIG. 3 that the lever 24 and link 26 form in effect a toggle linkage which crosses center when the lever 24 is swung down, so that it will latch the trays in their tilted storage position.

With the trays on several carts in their tilted storage position as illustrated in FIG. 5, the carts may be nested together by pushing one cart forwardly into nested relation with a cart ahead of it. The bases 15 will internest in this operation as best seen in FIGS. 5 and 6, due both to the upward angle of the base portions 15 and to the forwardly tapering configuration thereof. Since the shelves or trays 17 of the carts are tilted upwardly at their forward ends, the forward ends of the shelves or trays on the rear cart will pass over the upper surfaces of the shelves or trays on the forward cart as shown in FIG. 5. In this way the rearward cart can be moved closely adjacent to the forward cart with the forward frame member 11 of the rearward cart being closely adjacent to or in abutting relationship with the rear frame member 10 of the front cart. With the cart so nested a series of carts can be pushed along as a unit by one person and can easily be stored in a minimum amount of space.

When the carts are to be used again, the rearmost cart is pulled out of the nested group and the lever 24 thereon is swung upwardly to move its shelves or trays 17 to a horizontal working position. It will best be seen that by the present invention, a nestable cart is provided which can carry a series of objects in vertically spaced relation to each other on relatively large rectangular trays or shelves and which at the same time can easily be nested into a minimum amount of space with other similar carts for handling and storage.

While one embodiment of the invention has been shown and described in detail, it will be understood that this is for the purposes of illustration only and is not to be taken as a definition of the scope of the invention, reference being had for this purpose to the appended claims.

We claim as our invention:

1. A nestable cart comprising an upright frame, a plurality of vertically spaced trays pivoted on the frame on horizontal axes, means interconnecting the trays for simultaneous pivotal movement, and means to tilt the trays from a horizontal position to a position at an acute angle to horizontal in which they will interfit with trays on a similar cart.

2. A nestable cart comprising an upright frame, a plurality of vertically spaced trays pivoted on the frame on horizontal axes, a vertically movable link pivotally connected to the trays at points spaced from their pivotal axes, and means to move the link vertically thereby to tilt the trays about their pivotal axes.

3. The cart of claim 2 in which the last named means comprises a toggle linkage movable to an over-center position to hold the trays in a predetermined position.

4. A nestable cart comprising a base tapering from its rear to its front end to internest with a similar base of another cart, wheels supporting the base, an upright frame on the base adjacent to its rear end, a plurality of vertically spaced parallel trays pivoted on the frame and projecting forwardly therefrom, means interconnecting the trays for simultaneous pivotal movement, and means to tilt the trays about their pivotal mountings on the frame from a horizontal position to a position at an acute angle to horizontal to interfit with trays on a second cart.

5. A nestable cart comprising a base tapering from its rear to its front end to internest with a similar base of another cart, wheels supporting the base, a pair of horizontally spaced vertical frame members mounted on the base adjacent to the rear end thereof, a plurality of spaced parallel trays pivotally connected to one of the frame members and projecting forwardly therefrom, a link vertically slidable on the other frame member and pivotally connected to the trays, and means to shift the link vertically thereby to tilt the trays between a horizontal position and a position at an acute angle to horizontal.

6. The cart of claim 5 in which the last named means comprises a toggle linkage movable to an over-center position to hold the trays in one of said positions.

References Cited by the Examiner

UNITED STATES PATENTS

| | | | |
|---|---|---|---|
| 2,583,514 | 1/1952 | Maslow | 280—33.99 |
| 2,727,750 | 12/1955 | Noll | 280—33.99 |
| 2,738,201 | 3/1956 | Spears | 280—33.99 |
| 2,818,267 | 12/1957 | Watson | 280—33.99 |
| 2,928,681 | 3/1960 | Wilson | 280—33.99 |

FOREIGN PATENTS

| | | |
|---|---|---|
| 195,067 | 2/1908 | Germany. |

BENJAMIN HERSH, *Primary Examiner.*

M. L. SMITH, *Assistant Examiner.*